US008739938B2

(12) United States Patent
King et al.

(10) Patent No.: US 8,739,938 B2
(45) Date of Patent: *Jun. 3, 2014

(54) FRICTION BRAKE WITH A RESISTIVE SENSOR

(75) Inventors: Brian T. King, Kokomo, IN (US); Jerome A. Schneider, Kokomo, IN (US); Timothy J. Guse, Peru, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/363,826

(22) Filed: Feb. 1, 2012

(65) Prior Publication Data

US 2013/0192933 A1    Aug. 1, 2013

(51) Int. Cl.
*F16D 66/02* (2006.01)
(52) U.S. Cl.
USPC .................. 188/1.11 L; 188/1.11 E; 340/454
(58) Field of Classification Search
USPC ............. 188/1.11 L, 1.11 R, 1.11 E, 1.11 W; 340/464, 454
See application file for complete search history.

(56) References Cited

U.S. PATENT DOCUMENTS

| 3,015,950 | A | * | 1/1962 | Doctor et al. | 73/86 |
| 5,637,794 | A | * | 6/1997 | Hanisko | 340/453 |
| 6,360,850 | B1 | * | 3/2002 | Odisho et al. | 188/1.11 L |
| 6,366,201 | B1 | * | 4/2002 | Hanisko | 188/1.11 E |
| 7,165,657 | B2 | * | 1/2007 | Palladino | 188/1.11 E |
| 2005/0212357 | A1 | * | 9/2005 | Adams | 188/1.11 L |
| 2010/0017087 | A1 | * | 1/2010 | Degenstein | 188/1.11 L |
| 2010/0283595 | A1 | * | 11/2010 | Korecki et al. | 340/454 |

FOREIGN PATENT DOCUMENTS

| EP | 347654 A2 * 12/1989 |
| WO | WO 8900255 A1 * 1/1989 |

* cited by examiner

*Primary Examiner* — Thomas J Williams
(74) *Attorney, Agent, or Firm* — Quinn Law Group, PLLC

(57) ABSTRACT

A brake component for retarding a rotor includes a wearable friction segment having a thickness, wherein the friction segment is configured to be pressed into contact with the rotor. The brake component also includes a first resistive sensor having an electric resistance and a feature determinative of the electric resistance. The first resistive sensor is mounted on the friction segment and includes an electric connection for communication with an external device. The feature is configured to wear along with the friction segment thereby increasing the electric resistance of the first resistive sensor. A braking system employing the friction brake component to retard rotation of a wheel and for decelerating a motor vehicle is also disclosed.

20 Claims, 4 Drawing Sheets

FRICTION BRAKE WITH A RESISTIVE SENSOR

TECHNICAL FIELD

The present disclosure relates to a friction brake having a resistive sensor and a system employing same.

BACKGROUND

A brake is typically a mechanical device designed to inhibit motion. Brakes commonly use friction to convert kinetic energy into heat, though other methods of energy conversion may be employed. For example regenerative braking converts much of the energy to electric energy, which may be stored for later use.

On vehicles, braking systems are employed to apply a retarding force, typically via frictional elements at the vehicle's rotating axles or wheels, to inhibit vehicle motion. Friction brakes often include stationary shoes or pads that are lined with friction material and configured to be engaged with a rotating wear surface, such as a rotor or a drum. Common configurations include shoes that contact to rub on the outside of a rotating drum, commonly called a "band brake", a rotating drum with shoes that expand to rub the inside of a drum, commonly called a "drum brake", and pads that pinch a rotating disc, commonly called a "disc brake".

Modern vehicles typically use a hydraulic force to press the aforementioned shoes or pads against the respective rotating disc or drum, which slows the disc or drum and its attendant wheel. Generally, vehicle friction brakes store thermal energy in the disc brake or drum brake while the brakes are being applied and then gradually conduct the stored heat to the ambient. Additionally, during the process of retarding a vehicle, the friction surfaces of shoes or pads, as well as of the respective drums and rotors, experience wear. Accordingly, such friction surfaces must be periodically renewed or replaced.

SUMMARY

A brake component for retarding a rotor includes a wearable friction segment having a thickness, wherein the friction segment is configured to be pressed into contact with the rotor. The brake component includes a first resistive sensor having an electric resistance and a feature determinative of the electric resistance. The first resistive sensor is mounted on the friction segment and includes an electric connection for communication with an external device. The feature is configured to wear along with the friction segment thereby increasing the electric resistance of the first resistive sensor.

The brake component may also include a second resistive sensor having an electric resistance. The second resistive sensor may include an electric connection for communication with the external device and be mounted relative to the friction segment. The electric resistance of the second resistive sensor may be indicative of a temperature of the friction segment.

The first resistive sensor and the second resistive sensor may be combined into a unitary sensor element.

At least one of the first resistive sensor and the second resistive sensor may be printed on a substrate wherein the substrate is then affixed to the braking component. At least one of the first resistive sensor and the second resistive sensor may also be printed directly onto the braking component. Additionally, at least one of the first resistive sensor and the second resistive sensor may be configured as a thick film ink applied directly onto the braking component.

A braking system employing the brake component to retard rotation of a wheel is also disclosed. The braking system also includes an energy storage device, a rotor configured to synchronously rotate with the wheel, and an actuator configured to generate an actuator force. The braking system also includes the brake component described above and configured to be pressed into contact with the rotor by the actuator force for retarding rotation of the wheel. The braking system additionally includes a sending unit arranged relative to the brake component and in electric communication with the energy storage device and with the first resistive sensor of the braking component. The sending unit is configured to transmit a signal indicative of the electric resistance of the first resistive sensor.

The system may additionally include a controller in electric communication with the energy storage device. The controller may be configured to receive the signal indicative of the electric resistance of the first resistive sensor and determine the thickness of the friction segment according to the electric resistance of the first resistive sensor.

The controller may be additionally configured to receive the signal indicative of the electric resistance of the second resistive sensor and determine the temperature of the friction segment according to the electric resistance of the second resistive sensor. The controller may also generate a first signal indicative of the determined thickness of the friction segment and a second signal indicative of the determined temperature of the friction segment.

The rotor may be configured as one of a disc rotor and a brake drum, and the brake component may be correspondingly configured as one of a disc brake pad and a drum brake shoe.

The system may be employed for decelerating a motor vehicle.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
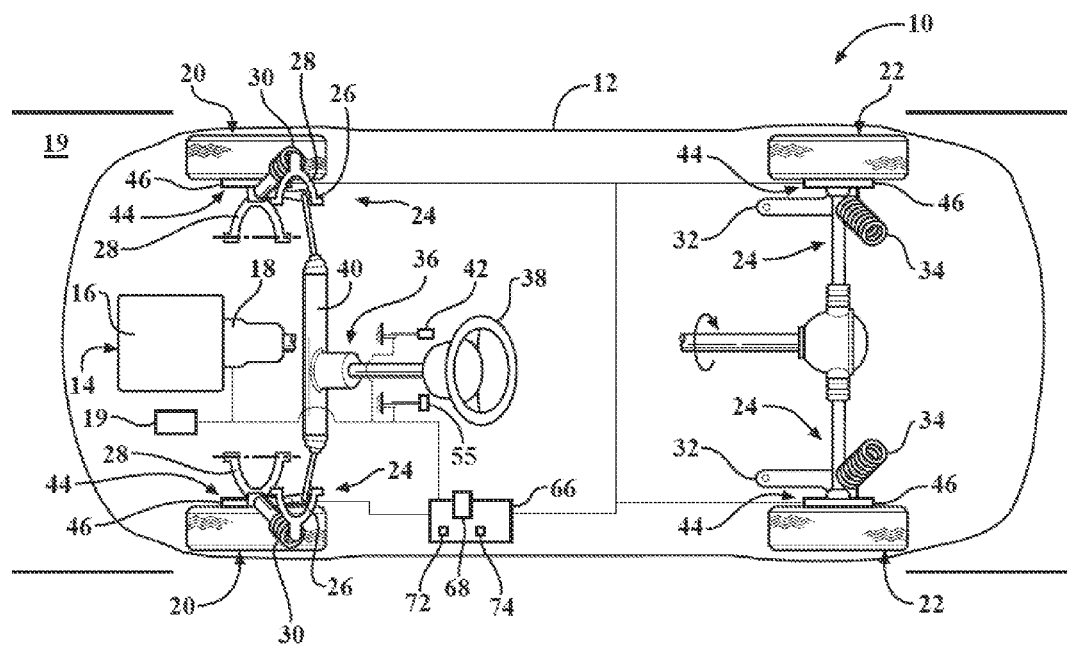
FIG. 1 is a schematic illustration of a motor vehicle having a braking system according to the disclosure.

Referring to the drawings, wherein like reference numbers refer to like components, FIG. 1 shows a schematic view of a motor vehicle 10 which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators as well as a fuel cell, neither of which are shown, but a powertrain configuration employing such devices is appreciated by those skilled in the art. The vehicle 10 also includes an energy storage device 19, such as one or more batteries, configured to accept electric charge and supply electric current to operate various vehicle systems.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface, and for maintaining handling of the vehicle. The suspension system 24 may include an upper control arm 26, a lower control arm 28 and a strut 30 connected to each of the front wheels 20. The suspension system 24 may also include a trailing arm 32 and a spring 34 connected to each of the rear wheels 22. Although a specific configuration of the suspension system 24 is shown in FIG. 1, other vehicle suspension designs are similarly envisioned.

As shown in FIG. 1, a vehicle steering system 36 is operatively connected to the front wheels 20 for steering the vehicle 10. The steering system 36 includes a steering wheel 38 that is operatively connected to the wheels 20 via a steering rack 40. The steering wheel 38 is arranged inside the passenger compartment of the vehicle 10, such that an operator of the vehicle may command the vehicle to assume a particular direction with respect to the road surface. Additionally, an accelerator pedal 42 is positioned inside the passenger compartment of the vehicle 10, wherein the accelerator pedal is operatively connected to the powertrain 14 for commanding propulsion of the vehicle 10.

As shown in FIG. 1, a vehicle braking system 44 is operatively connected to the wheels 20, 22 for decelerating the vehicle 10. The braking system 44 includes a friction braking mechanism 46 arranged at each of the wheels 20, 22. Each braking mechanism 46 may be configured as either a disc brake (shown in FIG. 2) or a drum brake (shown in FIG. 3). Each braking mechanism 46 includes a rotor 48 configured for synchronous rotation with the respective wheel 20, 22. Rotor material is generally selected for advantageous friction and wear characteristics, as well as effective heat resistance. Typically, rotors are formed out of cast iron, but may in some cases be made of composites such as reinforced carbon-carbon or ceramic matrix composites. Each braking mechanism 46 additionally includes an actuator 50, such as a hydraulically activated piston arranged in a brake caliper 50-1 of a disc brake (shown in FIG. 2) or in a foundation 50-2 of a drum brake (shown in FIG. 3), and configured to generate an actuator force 52.

Figure 2:
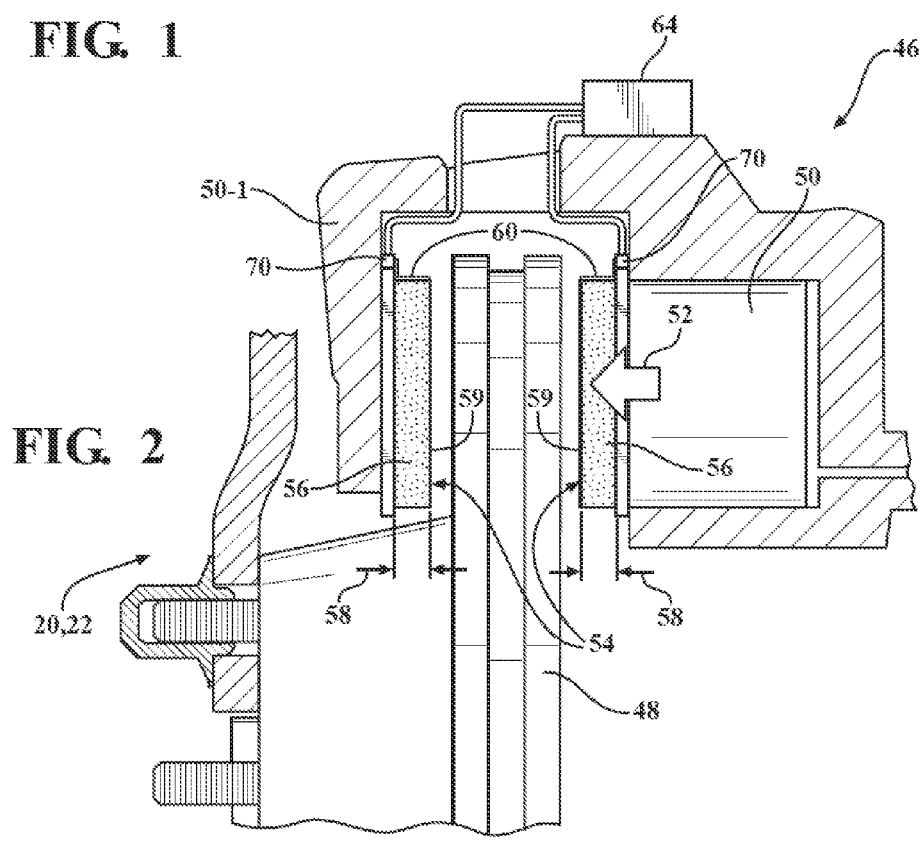
FIG. 2 is a schematic illustration of the braking system shown in FIG. 1, wherein the braking system is configured as a disc brake and includes a brake pad with a friction segment (depicted with the brake pad in a non-worn state and) having first and second resistive sensors.
Figure 3:
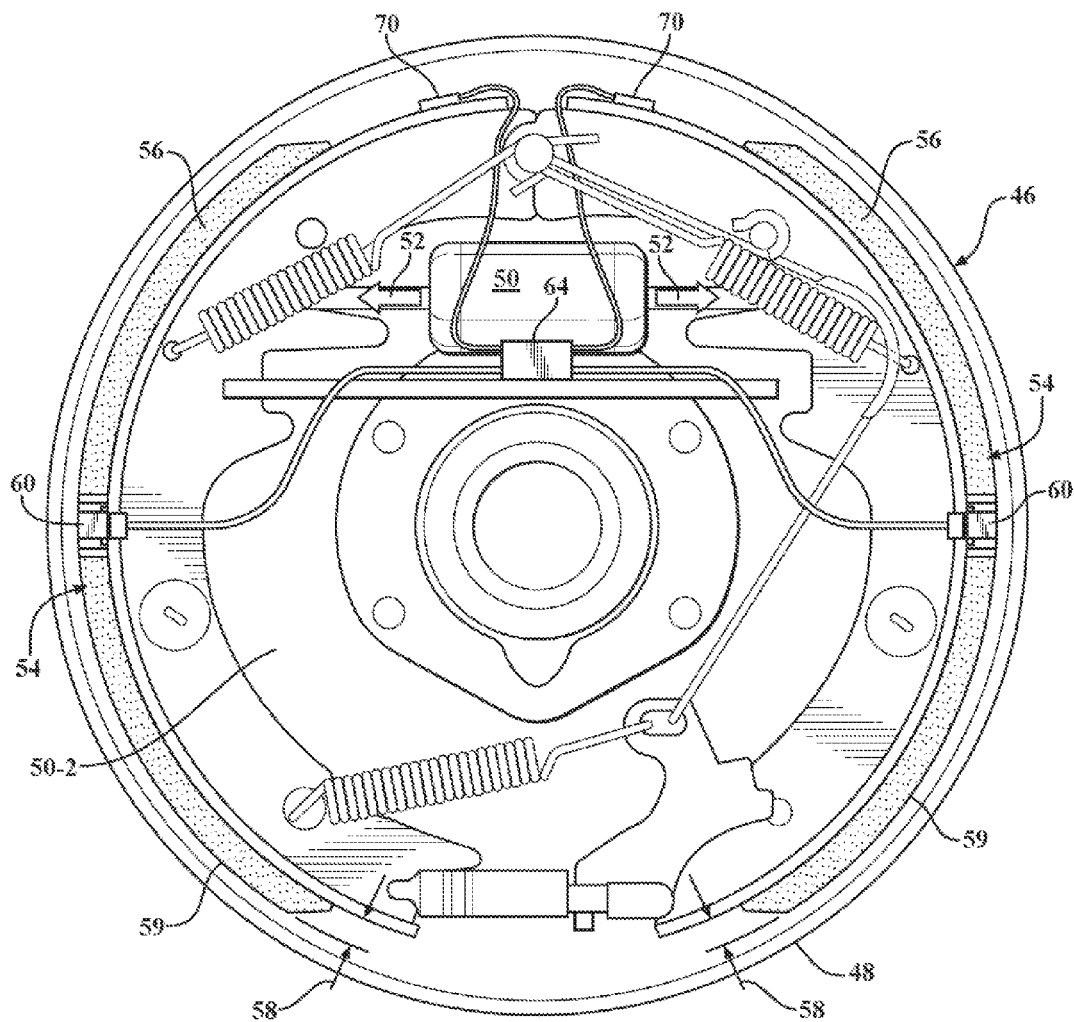
FIG. 3 is a schematic illustration of the braking system shown in FIG. 2, wherein the braking system is configured as a drum brake and includes a brake shoe with a friction segment (depicted with the brake shoe in a partially worn state) having first and second resistive sensors.

As shown in FIGS. 2 and 3, each braking mechanism 46 also includes a brake component 54 having a wearable, and therefore consumable, friction lining or segment 56. The friction segment 56 includes a thickness 58 configured to provide an extended degree of brake life. The friction segment 56 additionally includes a friction surface 59 that is configured to be pressed into contact with the rotor 48 by the actuator force 52 for retarding rotation of the respective wheel 20, 22. Typically, friction segments are composed of relatively soft but tough and heat-resistant materials having a high coefficient of dynamic friction, and, ideally an identical coefficient of static friction. Since the friction segment 56 is the portion of the braking mechanism 46 which converts the vehicle's kinetic energy into heat, the friction segment must be capable of surviving high temperatures without excessive wear or outgassing, which causes brake fade, i.e., a decrease in the brake's stopping power. Although the brake component 54 is shown as part of the braking system 44 being employed for retarding rotation of rotor 48 in the vehicle 10, nothing precludes the brake component 54 from being employed for friction braking relative movement of components in other systems. Such other systems may, for example, include industrial or manufacturing machines, e.g., stamping presses.

Friction segments such as the segment 56 are typically mounted on solid metal backing using high-temperature adhesives or rivets. Accordingly, braking components such as the brake component 54 usually require regular replacement, i.e., prior to the metal backing or rivets contacting the rotor, otherwise, the rotor may need to be resurfaced or replaced as well. The complete brake component 54 (including the segment 56) is typically called a "brake pad" or "brake shoe". As shown in FIG. 2, if the braking mechanism 46 is configured as a disc brake, the rotor 48 is configured as a disc rotor and the brake component 54 is correspondingly configured as a disc brake pad. As shown in FIG. 3, if the braking mechanism 46 is configured as a drum brake, the rotor 48 is configured as a brake drum and the brake component 54 is correspondingly configured as a drum brake shoe.

As shown in FIG. 2, in a disc brake, the caliper 50-1 is generally configured to hold a pair of braking components 54, i.e., brake pads, relative to the rotor 48, i.e., disc rotor, and apply the actuator force 52 to the brake pads in order to squeeze the disc rotor for decelerating the vehicle 10. As shown in FIG. 3, in a drum brake, a pair of braking components 54, i.e., brake shoes, are generally held inside the rotor 48, i.e., drum, and the actuator 50 applies the actuator force 52 to press the brake shoes against a perimeter of the inner surface of the drum to decelerate the vehicle 10. Additionally, in each case, of disc and drum brakes of FIGS. 2 and 3, respectively, the actuator force 52 is controlled via a brake pedal 55 (shown in FIG. 1). The brake pedal 55 is positioned inside the passenger compartment of the vehicle 10, and is adapted to be controlled by the operator of the vehicle.

Figure 4:
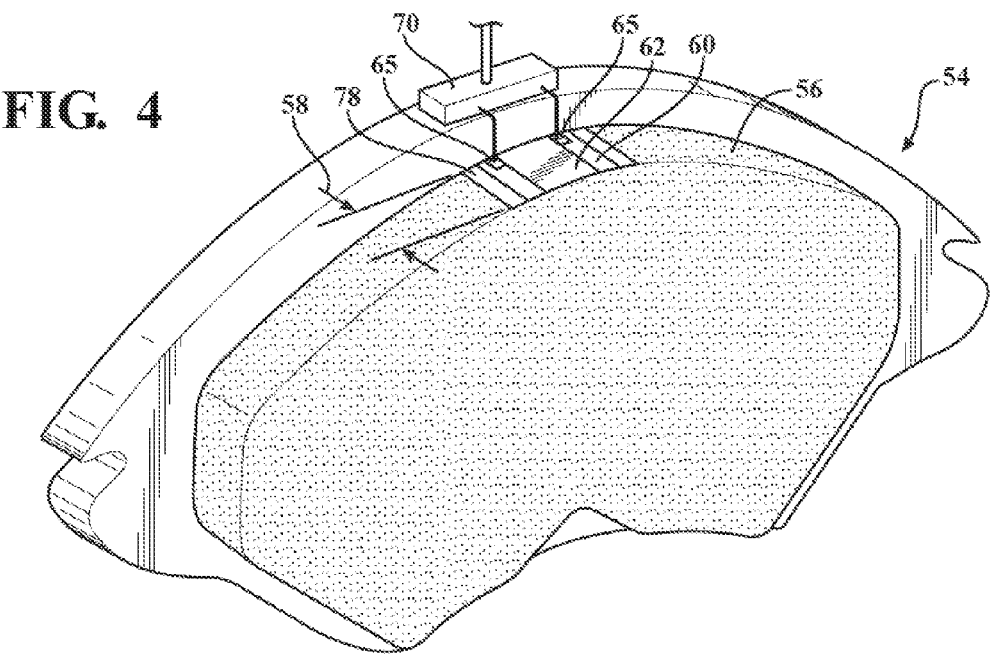
FIG. 4 is a schematic illustration of the brake pad shown in FIG. 2, having the first and second resistive sensors mounted thereon according to one embodiment.

As shown in FIGS. 2-4, each braking mechanism 46 additionally includes a first resistive sensor 60. The first resistive sensor 60 is having an electric resistance (R1) and a feature 62 (shown in FIG. 4), such as a thickness and/or a width of the first resistive sensor. The feature 62 is determinative of the electric resistance of the first resistive sensor 60. The feature 62 is configured to wear along with the friction segment 56 as the friction surface 59 is pressed against the rotor 48. Furthermore, as the feature 62 becomes worn down, the electric resistance of the first resistive sensor 60 is increased. The first resistive sensor 60 is mounted on the friction segment 56 and is in electric communication with an external device, which is shown as a sending unit 64 in FIGS. 2-3, via contact points 65 (shown in FIGS. 4-5).

The sending unit 64 is in electric communication with the energy storage device 19 and may be arranged on the brake component 54 or elsewhere on the vehicle 10. The sending unit 64 may be configured as a transmitter that generates a signal indicative of the electric resistance of the first resistive sensor 60 and broadcasts the signal via radio waves on a specifically selected frequency or via a wired electric connection to a programmable controller 66 (shown in FIG. 1). The controller 66 is arranged on the vehicle 10 relative to the braking system 44, includes a readily accessible long-term non-transient memory, and is in electric communication with the energy storage device 19. The controller 66 may include a receiver 68 configured to detect or receive the signal from the sending unit 64. The controller 66 is additionally configured to determine the thickness of the friction segment 56 according to the determined electric resistance of the first resistive sensor 60 transmitted by the sending unit 64.

As shown in FIGS. 2-3, each braking mechanism 46 may additionally include a second resistive sensor 70. The second resistive sensor 70 is having an electric resistance (R2), wherein the resistance R2 may be same as or different from the resistance R1 of the first resistive sensor 60. As shown, the second resistive sensor 70 is mounted on the braking mechanism 46 relative to the friction segment 56 and is in electric communication with the sending unit 64. The electric resistance of the second resistive sensor 70 is indicative of a temperature of the friction segment 56, i.e., is configured as a thermistor. In such a case, the controller 66 may be configured to receive the signal indicative of the electric resistance of the second resistive sensor 70. Furthermore, the controller 66 may then determine the temperature of the friction segment 56 according to the signal indicative of the electric resistance of the second resistive sensor 70 transmitted by the sending unit 64.

The controller 66 may additionally generate a first signal 72 indicative of the determined thickness of the friction segment 56 and a second signal 74 indicative of the determined temperature of the friction segment (shown in FIG. 1). The first and second signals 72, 74 may be communicated to the operator of the vehicle 10 in real time via a visual indicator on the vehicle's instrument panel to update the operator on the wear and temperature states of the friction segment 56. Furthermore, an audio and/or visual alert indicator may be activated to inform the operator when the braking mechanism 46 is due for replacement and/or the friction segment 56 has overheated. Additionally, the first and second signals 72, 74 may be codified and stored in the long-term non-transient memory of the controller 66 for subsequent retrieval by service personnel.

Figure 6:
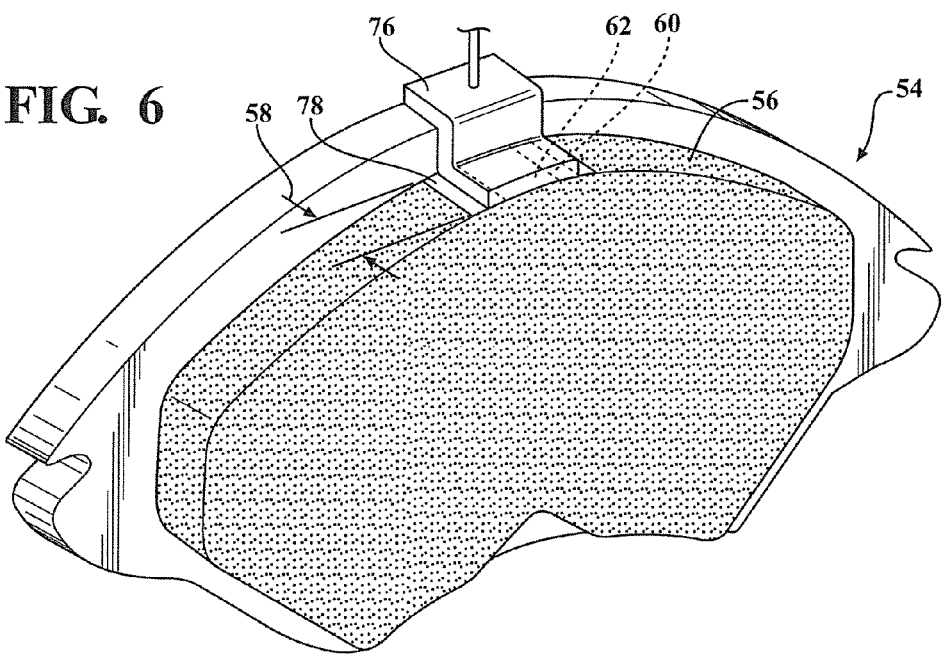
FIG. 6 is a schematic illustration of the brake pad shown in FIG. 2, having the first and second resistive sensors combined into a unitary sensor element according to yet another embodiment.

The first resistive sensor 60 and the second resistive sensor 70 may be combined into a unitary sensor element 76, as shown in FIG. 6. In such a case, the unitary sensor element 76 would include the feature 62 which would then wear along with the friction segment 56 as the friction surface 59 is pressed against the rotor 48. Accordingly, because the electric resistance of the unitary sensor element 76 increases as the feature 62 becomes worn down, a correlation or a predetermined relationship between the wear of the feature 62 and the resultant variation in temperature of the friction segment 56 may be established under controlled test conditions. Furthermore, thus established correlation of the wear on the feature 62 and the change in temperature of the friction segment 56 may then be programmed in the controller 66 for subsequent access and determination of actual temperature of the friction segment 56.

Figure 5:
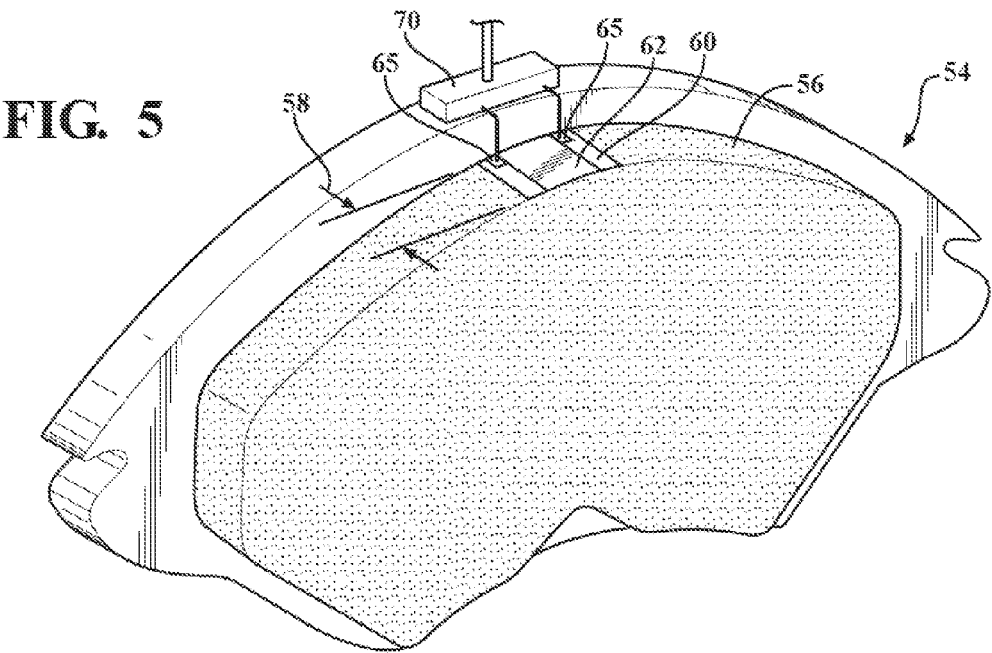
FIG. 5 is a schematic illustration of the brake pad shown in FIG. 2, having the first and second resistive sensors mounted thereon according to another embodiment.

Each of the first resistive sensor 60 and the second resistive sensor 70, as well as the combined first and second resistive sensor, i.e., the unitary sensor 76, may be formed and mounted on the braking mechanism 46 via a variety of methods. As shown in FIG. 4, each of the first and second resistive sensors 60, 70 may be printed on a substrate 78 and the substrate may then be affixed directly onto the friction segment 56 of the braking mechanism 46. As shown in FIG. 5, each of the first and second resistive sensors 60, 70 may be printed directly onto the friction segment 56 of the braking mechanism 46. Additionally, a thick film ink, that has a physical appearance similar to the configuration depicted in FIG. 5, may be used to form the first and second resistive sensors 60, 70, wherein the thick film ink is applied directly onto the friction segment 56.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A braking system for retarding rotation of a wheel, comprising:
   an energy storage device;
   a rotor configured to synchronously rotate with the wheel;
   an actuator configured to generate an actuator force;
   a brake component having a wearable friction segment, wherein the friction segment includes a thickness and is configured to be pressed into contact with the rotor by the actuator force for retarding rotation of the wheel;
   a sending unit in electric communication with the energy storage device, arranged relative to the braking component; and
   a first resistive sensor having an electric resistance and a feature determinative of the electric resistance;
   wherein:
      the first resistive sensor is configured as an ink film applied directly onto the friction segment;
      the first resistive sensor is in electric communication with the sending unit;
      the sending unit is configured to transmit a signal indicative of the electric resistance of the first resistive sensor; and
      the feature is configured to wear along with the friction segment, thereby increasing the electric resistance of the first resistive sensor.

2. The system according to claim 1, further comprising a controller in electric communication with the energy storage device, wherein the controller is configured to receive the signal indicative of the electric resistance of the first resistive sensor and determine the thickness of the friction segment according to the electric resistance of the first resistive sensor.

3. The system according to claim 2, further comprising a second resistive sensor having an electric resistance, wherein the second resistive sensor is mounted on the brake component relative to the friction segment in electric communication with the sending unit, and wherein the electric resistance of the second resistive sensor is indicative of a temperature of the friction segment.

4. The system according to claim 3, wherein the controller is configured to receive the signal indicative of the electric resistance of the second resistive sensor and determine the temperature of the friction segment according to the electric resistance of the second resistive sensor.

5. The system according to claim 4, wherein the controller generates a first signal indicative of the determined thickness of the friction segment and a second signal indicative of the determined temperature of the friction segment.

6. The system according to claim 3, wherein the first resistive sensor and the second resistive sensor are combined into a unitary sensor element.

7. The system according to claim 3, wherein the second resistive sensor is printed directly onto the braking component or configured as an ink film applied directly onto the braking component.

8. The system according to claim 1, wherein the rotor is configured as one of a disc rotor and a brake drum, and the brake component is correspondingly configured as one of a disc brake pad and a drum brake shoe.

9. A motor vehicle comprising:
an energy storage device;
a road wheel; and
a braking system operatively connected to the road wheel for decelerating the vehicle, the braking system including:
  a rotor configured to synchronously rotate with the road wheel;
  an actuator configured to generate an actuator force;
  a brake component having a wearable friction segment, wherein the friction segment includes a thickness and is configured to be pressed into contact with the rotor by the actuator force for retarding rotation of the road wheel;
  a sending unit in electric communication with the energy storage device and arranged relative to the braking component; and
  a first resistive sensor having an electric resistance and a feature determinative of the electric resistance;
  wherein:
    the first resistive sensor is configured as an ink film applied directly onto the friction segment;
    the first resistive sensor is in electric communication with the sending unit;
    the sending unit is configured to transmit a signal indicative of the electric resistance of the first resistive sensor; and
    the feature is configured to wear along with the friction segment, thereby increasing the electric resistance of the first resistive sensor.

10. The vehicle according to claim 9, further comprising a controller in electric communication with the energy storage device, wherein the controller is configured to receive the signal indicative of the electric resistance of the first resistive sensor and determine the thickness of the friction segment according to the electric resistance of the first resistive sensor.

11. The vehicle according to claim 10, further comprising a second resistive sensor having an electric resistance, wherein the second resistive sensor is mounted on the brake component relative to the friction segment in electric communication with the sending unit, and wherein the electric resistance of the second resistive sensor is indicative of a temperature of the friction segment.

12. The vehicle according to claim 11, wherein the controller is configured to receive the signal indicative of the electric resistance of the second resistive sensor and determine the temperature of the friction segment according to the electric resistance of the second resistive sensor.

13. The vehicle according to claim 12, wherein the controller generates a first signal indicative of the determined thickness of the friction segment and a second signal indicative of the determined temperature of the friction segment.

14. The vehicle according to claim 11, wherein the first resistive sensor and the second resistive sensor are combined into a unitary sensor element.

15. The vehicle according to claim 10, wherein the second resistive sensor is printed directly onto the braking component or configured as an ink film applied directly onto the braking component.

16. The vehicle according to claim 9, wherein the rotor is configured as one of a disc rotor and a brake drum, and the brake component is correspondingly configured as one of a disc brake pad and a drum brake shoe.

17. A brake component for retarding a rotor, comprising:
  a wearable friction segment having a thickness, wherein the friction segment is configured to be pressed into contact with the rotor;
  a first resistive sensor having an electric resistance and a feature determinative of the electric resistance;
  wherein:
    the first resistive sensor is configured as an ink film applied directly onto the friction segment and includes an electric connection for communication with an external device; and
    the feature is configured to wear along with the friction segment thereby increasing the electric resistance of the first resistive sensor.

18. The brake component according to claim 17, further comprising a second resistive sensor having an electric resistance, wherein the second resistive sensor includes an electric connection for communication with the external device, is mounted relative to the friction segment, and the electric resistance of the second resistive sensor is indicative of a temperature of the friction segment.

19. The brake component according to claim 18, wherein the first resistive sensor and the second resistive sensor are combined into a unitary sensor element.

20. The brake component according to claim 18, wherein the second resistive sensor is printed on a substrate and the substrate is affixed to the braking component, printed directly onto the braking component, or configured as an ink film applied directly onto the braking component.

* * * * *